United States Patent [19]
Freeman

[11] Patent Number: 4,536,764
[45] Date of Patent: Aug. 20, 1985

[54] METHOD OF COUNTING MULTIPLE TARGETS IN THE POST DETECTION PROCESSING OF A RADAR

[75] Inventor: Robert D. Freeman, Severna Park, Md.

[73] Assignee: Westinghouse Electric Corp., Pittsburgh, Pa.

[21] Appl. No.: 427,332

[22] Filed: Sep. 29, 1982

[51] Int. Cl.$^3$ .......................... G01S 13/52; G01S 7/28
[52] U.S. Cl. ............................ 343/5 SA; 343/5 FT; 343/5 DP; 343/7 A
[58] Field of Search .............. 343/5 SA, 5 FT, 5 NQ, 343/7 A, 7.7, 17.1 R

[56] References Cited

U.S. PATENT DOCUMENTS

| | | | |
|---|---|---|---|
| 2,999,236 | 9/1961 | Lewinter | 343/17.1 R |
| 3,242,487 | 3/1966 | Hammack | 343/7 A |
| 3,386,091 | 5/1968 | Wilmot et al. | 343/17.1 R |
| 3,573,820 | 4/1971 | Bohacek | 343/17.1 R |
| 3,631,489 | 12/1971 | Cooper | 343/7.7 |
| 3,721,979 | 3/1973 | Gouldthorpe | 343/7 A |
| 3,772,689 | 11/1973 | Root, Jr. | 343/5 SA |
| 3,806,929 | 4/1974 | Moore | 343/5 SA |
| 3,896,434 | 7/1975 | Sirven | 343/5 SA |
| 4,010,467 | 3/1977 | Slivku | 343/7.4 |
| 4,035,797 | 7/1977 | Nagy | 343/5 SA |
| 4,062,012 | 12/1977 | Colbert et al. | 343/7 A |
| 4,074,264 | 2/1978 | Wilmont | 343/17.1 R |
| 4,249,177 | 2/1981 | Chen | 343/7 A |
| 4,308,538 | 12/1981 | Albersheim | 343/16 M |
| 4,348,674 | 9/1982 | Muth et al. | 343/5 SA |

FOREIGN PATENT DOCUMENTS

| | | | |
|---|---|---|---|
| 0034125 | 8/1981 | European Pat. Off. | 343/5 SA |
| 1766149 | 7/1971 | Fed. Rep. of Germany | 343/5 SA |

Primary Examiner—T. H. Tubbesing
Assistant Examiner—Gilberto Barrón, Jr.
Attorney, Agent, or Firm—William E. Zitelli

[57] ABSTRACT

A method of analyzing the doppler spectrum obtained from narrow band doppler filtering in the post-detection processing of a radar for the purposes of counting multiple targets moving in close proximity to one another is disclosed. More specifically, a set of contiguous doppler frequency signals is selected from the computed doppler frequency spectrum of a range gate of a radar look for establishing the target count thereof. The selected doppler frequency signals are processed in two passes with each pass including the steps of searching, threshold detection, and target counting. A pass count is established for each pass. The pass counts are combined in a predetermined count algorithm to establish a final count of the range gate being processed. Moreover, a selected group of contiguous range gates may be selected to establish a cumulative or total final count of targets in a selected portion of the range of a radar look. The established final counts of the selected range gates are combined in a cumulative count algorithm which takes into consideration range gate signal quality and the avoidance of multiple countings of a common target which may straddle adjacent range gates.

12 Claims, 17 Drawing Figures

CLUMP COUNTER EXAMPLES

| Ex. | OUTPUT ARRAY FROM THRESHOLD DETECTOR | CLUMP COUNTER OUTPUT (FOR CLUMP WIDTH = 3) |
|---|---|---|
| a. | 000010000000___ | 1 |
| b. | 000011000000___ | 1 |
| c. | 0000111000 00___ | 1 |
| d. | 0000111,10000___ | 2 |
| e. | 00001111111 0___ | 3 |
| f. | 001100000110___ | 2 |
| g. | 000001010000___ | 2 |

FIG. 6

METHOD OF COUNTING MULTIPLE TARGETS IN THE POST DETECTION PROCESSING OF A RADAR

GOVERNMENT CONTRACT CLAUSE

The Government has rights in this invention pursuant to Contract No. F09603-78-G-0662-5610 awarded by the Department of the Air Force.

BACKGROUND OF THE INVENTION

The present invention relates to the post detection processing of a radar, and more particularly to a method of counting multiple targets moving in close proximity to one another.

Radars employing high resolution doppler processors are normally used for situations where there are a number of targets moving in close proximity to one another and an accurate measurement of range, angle or velocity is required for each target. However these radars are unable to obtain other information from the radar echo signals, such as the number of targets present in a target cluster, for example. Present radars are capable of identifying multiple targets which are spread out in the field of view thereof or are capable of searching for and tracking individual target clusters, without determining the number of targets in the tracked cluster. Generally, the task of counting multiple targets in a moving target cluster is left to the skill of a trained observer using a well designed display format of the post detection processed radar information. In a tactical military aircraft raid encounter, for example, the pilot must make an assessment of the target count with speed, accuracy and reliability in order to determine the form of action to take to protect himself and the equipment. Clearly, there is a need especially in this example for a method that can perform automatically and reliably the task of counting the number of targets in a raid cluster without burdening the pilot with an additional manual task during this critical period. Such a mechanism would be an invaluable aid to the pilot especially in the raid assessment mode.

A method capable of analyzing the doppler spectrum obtained from narrowband doppler filtering in the post detection processing of a radar for the purpose of counting the number of targets present appears, on the surface at least, somewhat simple. However, an accurate count of targets does not fall out naturally by simple examination of the narrowband doppler filter bank output because the doppler frequency signals are usually greatly perturbed by interference. Some interferring obstacles which any such target counting method would be expected to contend with are noise, amplitude scintillation, doppler frequency scintillation, and other signal perturbations which may be caused by echos from sources of the target aircraft other than skin returns, such as blades, turbines, motors and the like. Accordingly, the true nature of multitarget doppler frequency signatures can only be identified after an extensive study of many samples of recorded radar returns obtained under a variety of conditions. Even the way to deal with the doppler frequency filter signals and their perturbations resulting from controlled test environments is not uniquely nor immediately apparent.

SUMMARY OF THE INVENTION

In accordance with the principles of the present invention, a method of counting multiple targets moving in close proximity to one another is carried out in the post detection processing of a radar. The method comprises the steps of: selecting a set of contiguous doppler frequency signals from a plurality of doppler frequency signals computed from the received echo signal information in a range gate of a radar look; identifying a first doppler frequency from the selected set in accordance with the amplitude of the signal associated therewith; selecting a first contiguous subset of doppler frequencies of the set positioned about the first doppler frequency; deriving a first threshold level based on the amplitude of the first doppler frequency signal; counting the doppler frequency signal amplitudes in the first contiguous subset which exceed the first threshold signal to establish a first count; thereafter, identifying a second doppler frequency from the selected set in accordance with the amplitude of the signal associated therewith; selecting a second contiguous subset of doppler frequencies of the set positioned about the second doppler frequency; deriving a second threshold level based on the amplitude of the second doppler frequency signal and the established first count; counting the doppler frequency signal amplitudes in the second contiguous subset which exceed the second threshold level to establish a second count; and deriving a final count from the first and second counts in accordance with a predetermined count algorithm, whereby the final count is representative of the multi-target count for the range gate being processed.

In one embodiment, the first doppler frequency is identified as having the largest amplitude signal in the selected set of contiguous doppler frequency signals. In addition, the step of identifying the second doppler frequency includes the steps of: attenuating the signal amplitudes of the first doppler frequency and a predetermined group of doppler frequencies positioned thereabout; and thereafter, identifying the second doppler frequency as having the largest amplitude of the unattenuated signals in the selected set of contiguous doppler frequency signals. The attenuation of the group of doppler frequencies positioned about the first doppler frequency may be carried out by blanking the amplitudes thereof. Moreover, the step of counting to establish the first and second counts may each include the steps of: identifying groupings of contiguous doppler frequency signal amplitudes which exceed the threshold value associated therewith; partitioning each grouping into clumps; and counting the partitioned clumps to establish the first or second count. Each grouping may be partitioned in clumps which are limited to a prespecified number of contiguous doppler frequency signal amplitudes.

Still further, the step of deriving the final count from the first ($C1$) and second ($C2$) counts include the steps of: deriving an intermediate final count ($C$) in accordance with a count algorithm which is expressed mathematically as:

$$C = C_1 - |C_2 - C_1| + 1;$$

deriving the final count as the intermediate count if the intermediate count is derived as greater than or equal to one; and deriving the final count as one if the intermediate count is derived as less than one.

More particularly, the method may further include the steps of selecting a group of contiguous range gates of the received echo signals of a radar look; processing the received echo signal information of each selected range gate of a radar look in accordance with the aforementioned method steps to establish a final count for each selected range gate; and combining the final counts established for each selected range gate in accordance with a predetermined cumulative count algorithm to establish a total final count, whereby the total final count is representative of the discriminative target count for the portion of the radar range determined by the selected group of range gates of a radar look. This method may further include the step of invalidating the final counts derived from selected range gates that are determined to have inadequate doppler frequency signal quality, whereby the invalidated final counts are not combined in the cumulative count algorithm in establishing the total final count. Still further, the inventive method may include additional steps in the combining of the final counts to avoid multiple countings of a common target which may straddle a pair of range gates.

BRIEF DESCRIPTION OF THE DRAWINGS

FIG. 6 is an illustration depicting various examples of clump counting typical of the operation of the first and second pass doppler clump counters of the embodiment depicted in FIG. 2.

DESCRIPTION OF THE PREFERRED EMBODIMENT

Figure 1:
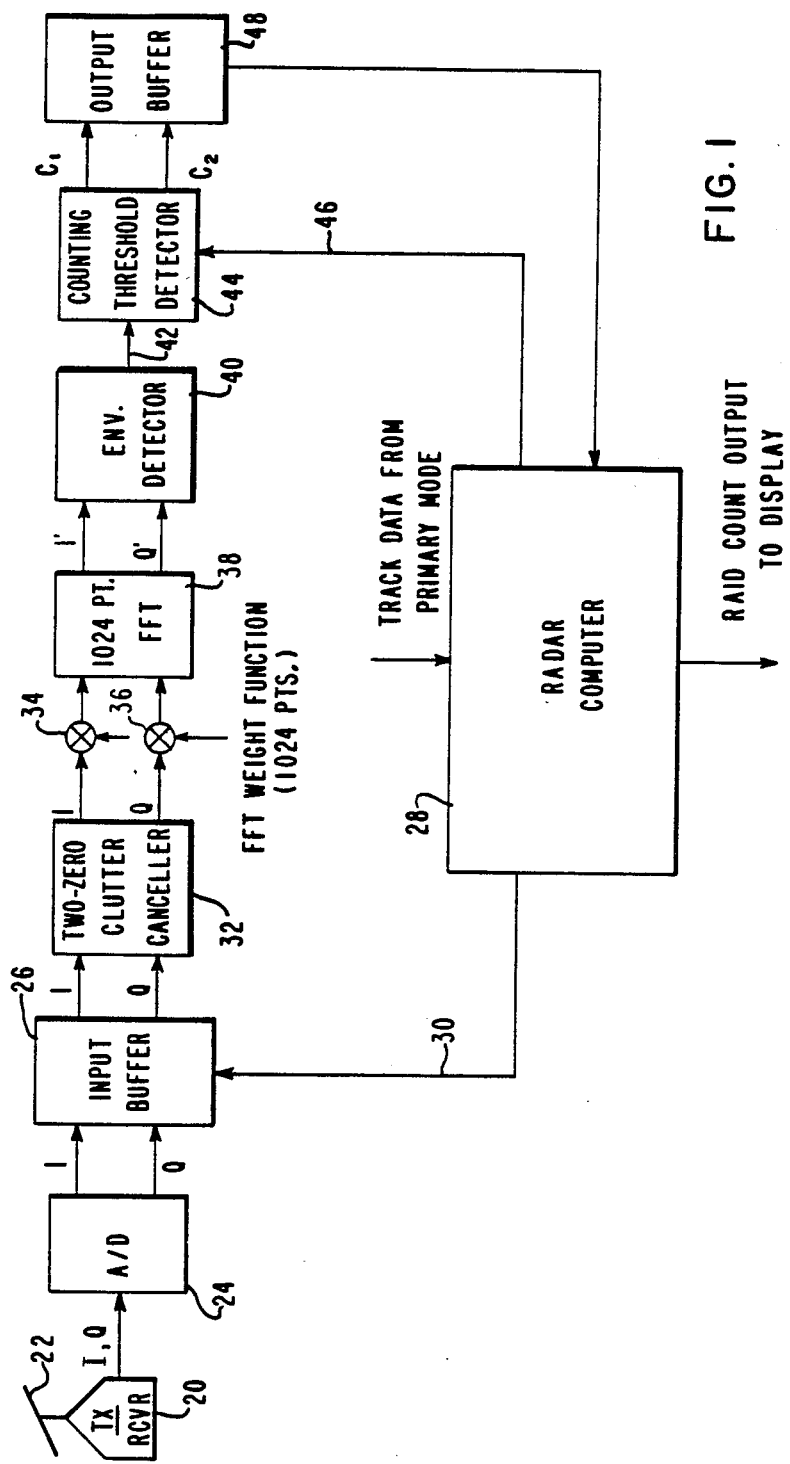
FIG. 1 is a functional block diagram schematic of a radar suitable for embodying the principles of the present invention.

FIG. 1 is a block diagram schematic of a radar suitable for embodying the principles of the present invention. A conventional transmitter/receiver unit 20 is coupled to a radar antenna 22 for transmitting radar signals of a given beam width into space at predetermined azimuth and elevation angles and for receiving radar echo signals reflected from objects in the path of the radar beam width. In the present embodiment, the unit 20 may be of a pulse doppler variety which emits pulses at some predetermined pulse repetition frequency (prf) and receives range related radar echo returns during the interpulse periods thereof. For the present example, a radar look may be defined as the transmission of a given number of pulses, say 1024 pulses, for example, at a substantially fixed azimuth and elevation angle. The received radar echo signals of the interpulse periods of each look may be converted into in phase (I) and quadrature (Q) signals by the unit 20 and provided to an analog-to-digital converter (A/D) 24 for digitization. The digital I and Q signals may thereafter be provided to an input buffer 26 which may be governed by a preprogrammed radar computer 28 utilizing the signal line 30.

Under programmed computer control, the I and Q signals of the buffer 26 may be provided to a conventional clutter canceller 32 which in the present example is a two-zero clutter canceller, and thereafter, provided to respective multiplication units 34 and 36. In the multiplication units 34 and 36, the I and Q signals are weighted by Fast Fourier Transform (FFT) weighting signals and then provided to a doppler processing unit 38 which in the present example is a 1024 point FFT. The FFT processor 38 transforms the time domain I and Q echo signals in each range gate of a radar look into corresponding pluralities of doppler frequency signals. This transformed plurality of doppler frequency signals I' and Q' may be provided to an envelope detector 40 which combines correspondingly respective I' and Q' signals to yield the amplitudes thereof over signal lines 42.

In accordance with the broad principles of the present invention, a counting threshold detector 44, included in the post detection processing apparatus of the radar, operates on the amplitude signals of the plurality of computed doppler frequency signals or doppler frequency signal spectra for counting multiple targets moving in close proximity to one another. Control data for governing the counting threshold detector 44 is provided by the programmed radar computer 28 utilizing the signal lines 46. Doppler count information $C_1$ and $C_2$ for each range gate may be provided to a temporary output buffer storage unit 48 and thereafter to the programmed radar computer 28 which includes a programmed count algorithm for deriving a final count for each selected range gate from the doppler count information $C_1$ and $C_2$ associated therewith. Accordingly, this final count is representative of the multitarget count for the range gate being processed.

In operation then, the unit 20 transmits and receives pulse doppler radar information for each radar look and digitizes the I and Q echo signal information in the high speed A/D converter 24. The input buffer 26 may store the I and Q digitized echo signal information of a selected group of contiguous range gates of a radar look as governed by the program radar computer 28 over signal line 30. In one scenario, the radar computer 28 may collect track data from a tracked target cluster detected by the radar while in the track mode for use in governing the selection of range gates in the buffer 26. The clutter canceller 32 operates on the received echo signal information of the selected group of range gates to remove the clutter signals substantially therefrom. Thereafter, the clutter free I and Q signals are FFT weighted in multiplication units 34 and 36 and provided to the doppler processor 38. The doppler processor 38 functions conventionally as a plurality of narrowband filter banks for computing a plurality of doppler frequency signals for each range gate of the selected group, the amplitudes of which being computed in the detector unit 40 and thereafter provided to the counting threshold detector 44 which establishes doppler count information $C_1$ and $C_2$ for each of the selected range gates.

Summarizing up to this point, a group of contiguous range gates of the received echo signals of a radar look are selected and processed in accordance with the operations of the input buffer 26, clutter canceller 32, FFT processor 38, envelope detector 40, and counting threshold detector 44. The resulting doppler count information $C_1$ and $C_2$ along with additional relevant information which will be further explained in the following paragraphs is provided to the programmed radar computer 28 via buffer 48 for further processing. The radar computer 28, programmed in accordance with the past detection processing of the radar, may combine the doppler count information established for each of the selected range gates in accordance with a predetermined cumulative count algorithm to establish a total final count, whereby the total final count is representative of the discriminated target count for the portion of the radar range, determined by the selected group of range gates, of a radar look.

Figure 2:
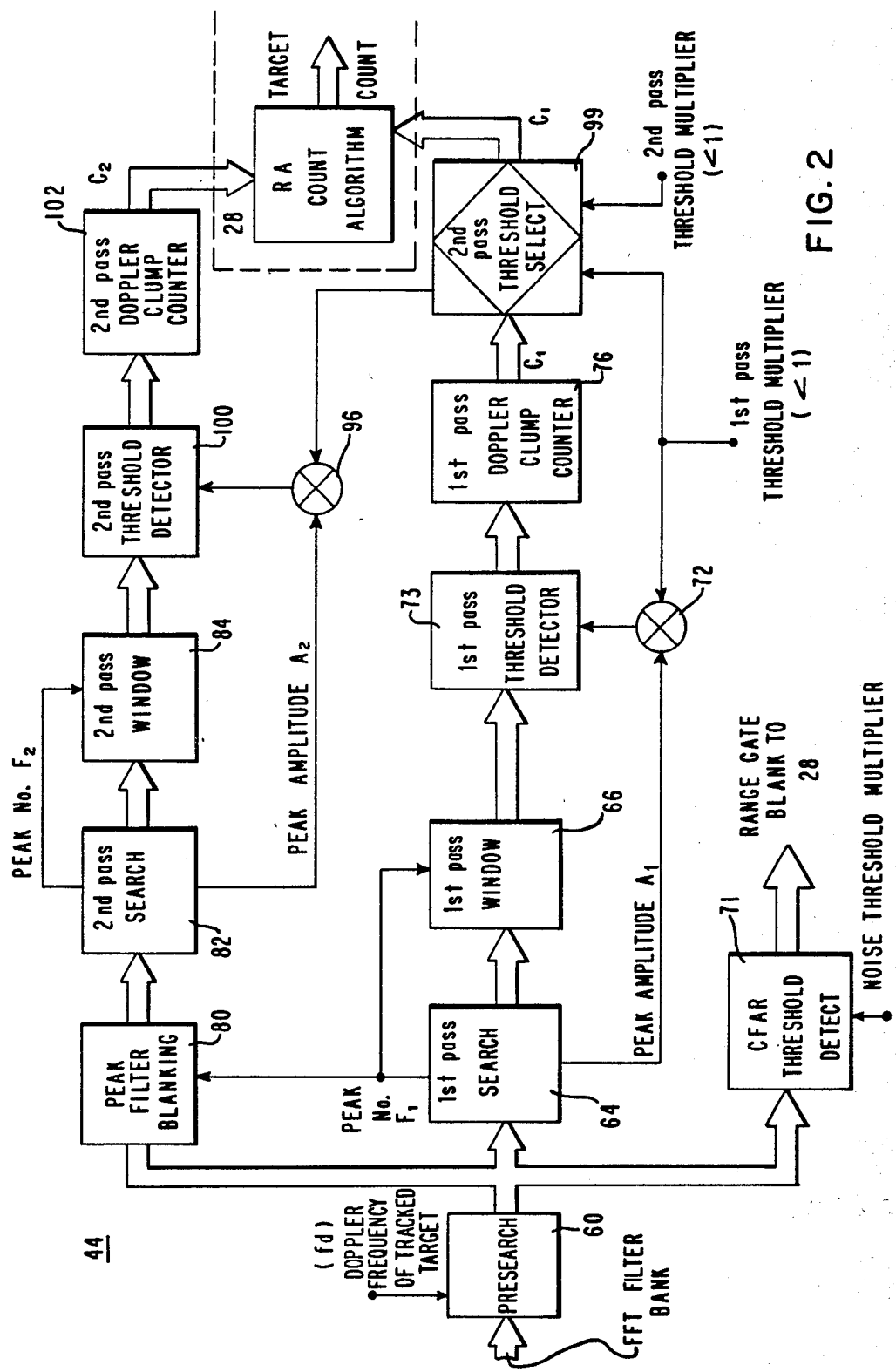
FIG. 2 is a functional block diagram schematic of a counting threshold detector suitable for use in the embodiment of FIG. 1.
Figure 3:
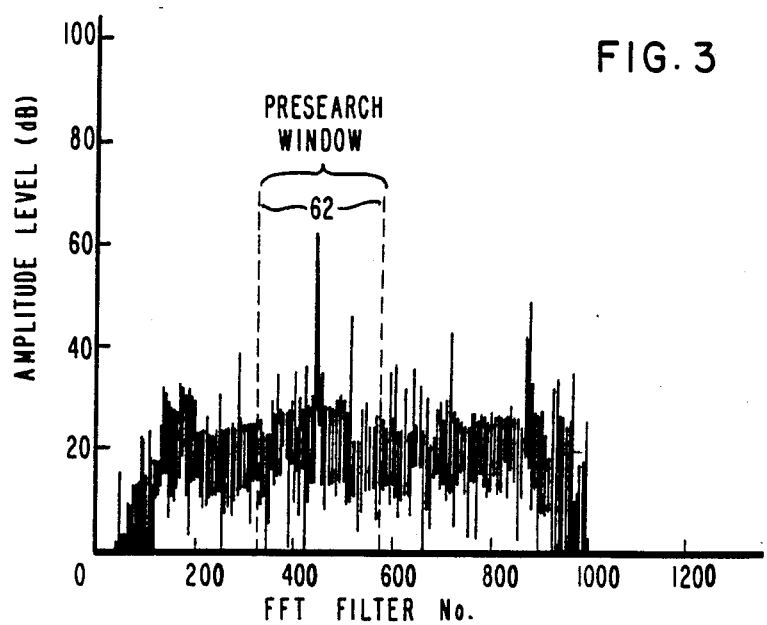
FIG. 3 is a graph which depicts the amplitude spectrum of a 1024 point FFT typifying the doppler frequency signal spectra output of a doppler processor.

The method of operation of the counting threshold detector 44 will be described in the following paragraphs in connection with the functional block diagram schematic of FIG. 2 and the associated graphs and illustrations of FIGS. 3 through 9. Referring to FIG. 2, the output signals of the FFT filter bank may be operated on by a presearch functional block 60 which functions to select a presearch window or set of contiguous doppler frequency signals from the plurality of doppler frequency signals of the FFT filter bank for each range gate. In one case, the selected set may be positioned about a doppler frequency, fd, of a tracked target cluster obtained from the tracking mode of the radar. However, it is understood that other suitable methods may be used for this selection process without deviating from the inventive principles. The graph of FIG. 3, which depicts the amplitude spectrum of a 1024 point FFT, typifies the doppler frequency signal spectra provided to the presearch block 60. The selected presearch window, for the present example, is denoted as being those contiguous doppler frequency signals within the dashed lines 62.

Figure 4:
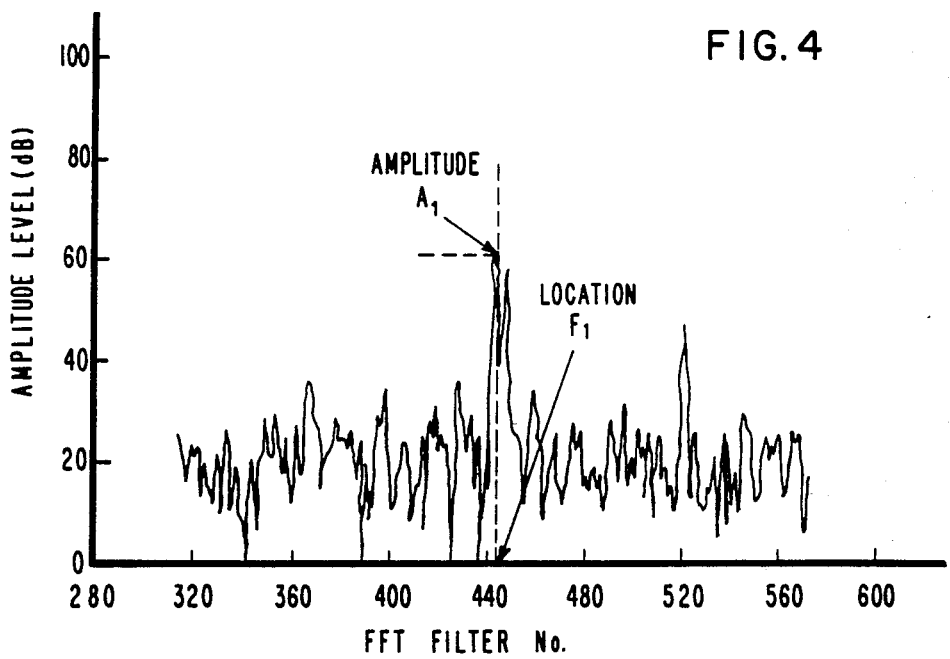
FIG. 4 is a graph which depicts the doppler frequency amplitude spectra of a set of contiguous doppler frequencies selected from the doppler frequency spectrum of a doppler processor.
Figure 5:
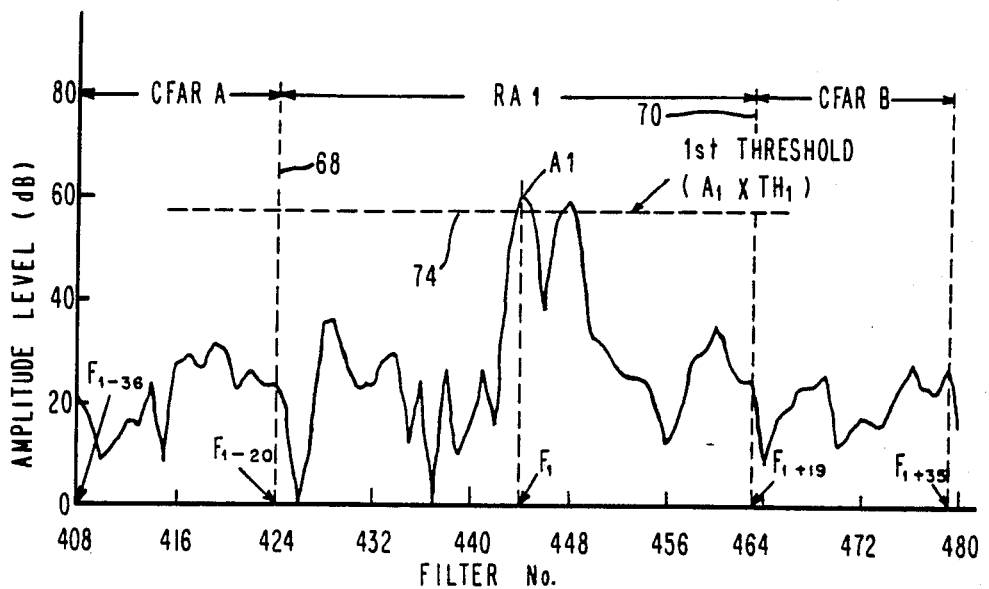
FIG. 5 is a graph which illustrates the selection of a number of doppler frequency subsets selected from the set of doppler frequencies as depicted in the graph of FIG. 4.

The counting method of functional block 44 operates on the selected doppler frequency signals in two passes with each pass including three main functions: search, threshold detection, and clump counting. FIG. 4 graphically illustrates the amplitude spectra of a typical presearch window selection (i.e. expanded from FIG. 3) which is operated on by a first pass search function 64 as depicted in FIG. 2. The operation of the first pass search function 64 identifies the location of a first doppler frequency, denoted as F1, in accordance with the amplitude A1 associated therewith. As depicted in the graph of FIG. 4, the first doppler frequency F1 is identified, preferably, as having the largest spectral line amplitude (i.e. peak amplitude) within the selected presearch window 62. In another functional block 66, a first contiguous subset of doppler frequencies of the presearch window is selected positioned about the first doppler frequency F1. The selected first subset is illustrated graphically in FIG. 5 as those doppler frequencies between the dashed lines 68 and 70 and denoted as RA1. In the present example, the size of the subset window RA1 may be 40 filters wide and preferably centered about the identified doppler frequency F1 as shown in FIG. 5. For example, if the first doppler frequency is identified at the doppler filter number 444 with an amplitude of approximately 61 dB then the width of the subset window may extend from the filter number 424 to the filter number 463 (i.e. F1−20 to F1+19).

After the first subset of contiguous doppler frequencies are selected, a first threshold level, denoted by the dashed lines 74 in FIG. 5, is derived based on the amplitude A1 of the first doppler frequency signal F1. As shown in the functional schematic of FIG. 2, the amplitude A1 is multiplied by a first pass threshold multiplier (TH1) in the multiplier 72 to form the first threshold. In the present embodiment, this first pass threshold multiplier TH1 is always less than 1, and for this particular example is 0.631 which should set the first threshold level a specified number of dB, say around four dB, for example, below the largest amplitude peak A1.

Thereafter, in accordance with the operation of a first pass threshold detection function 73, a bit may be set for each of the doppler frequency signal amplitudes in the first subset RA1 which exceed the first threshold level 74. This pattern of bits may be provided to a first pass doppler counting function 76 for each of the selected range gates. For each range gate, the counting function 76 operates to count contiguous groups of the set bits in the bit patterns thereof where the maximum width of a group or clump of the set bits may be limited to a predetermined number. For the present example, the clump width may be set to match the average width, a number of doppler frequency filters, of a typical target spectrum at the threshold level. A clump width of three doppler filters was found suitable for the present embodiment. The graphic illustrations of FIG. 6 depict examples of clump counting obtained from various bit patterns using a basic three filter clump width limitation. The first pass target count $C_1$ is thus rendered from the counting function 76 for each selected range gate and is provided to the programmed radar computer 28 via output buffer 48 for use in deriving the final count for its corresponding range gate and ultimately the total final count for all of the selected range gates.

Figure 7:
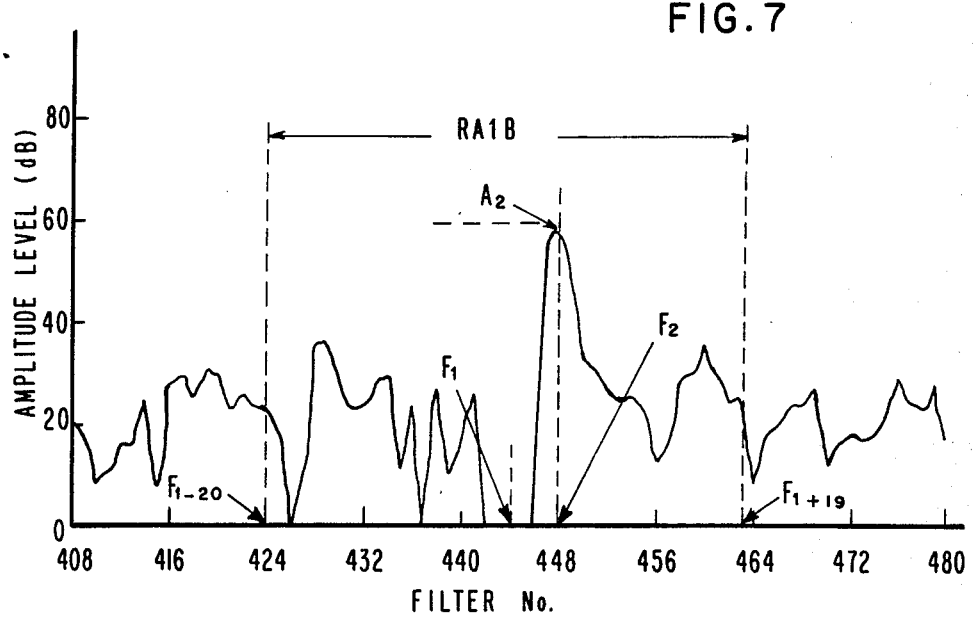
FIG. 7 is a graph illustrating peak filter blanking suitable for use in the second pass operations in the embodiment of FIG. 2.

Once the first doppler frequency F1 is identified and first pass count $C_1$ is established, the second pass operation may commence utilizing these factors. In connection with the second pass operation, the signal amplitudes of the first doppler frequency F1 and a predetermined group of doppler frequencies positioned thereabout may be attenuated in the peak filter blanking function 80. In the present method embodiment as shown in FIG. 7 for example, the group of doppler filter frequencies from filter number 442 through 446, inclusive, centered about the identified doppler frequency filter F1, are blanked (i.e. their amplitudes set to zero). This amount of doppler frequency signal blanking about the identified doppler frequency signal F1 may be made near optimum dependent on the PRF and the FFT weighting used in the processing of the received echo signal information.

Figure 8:
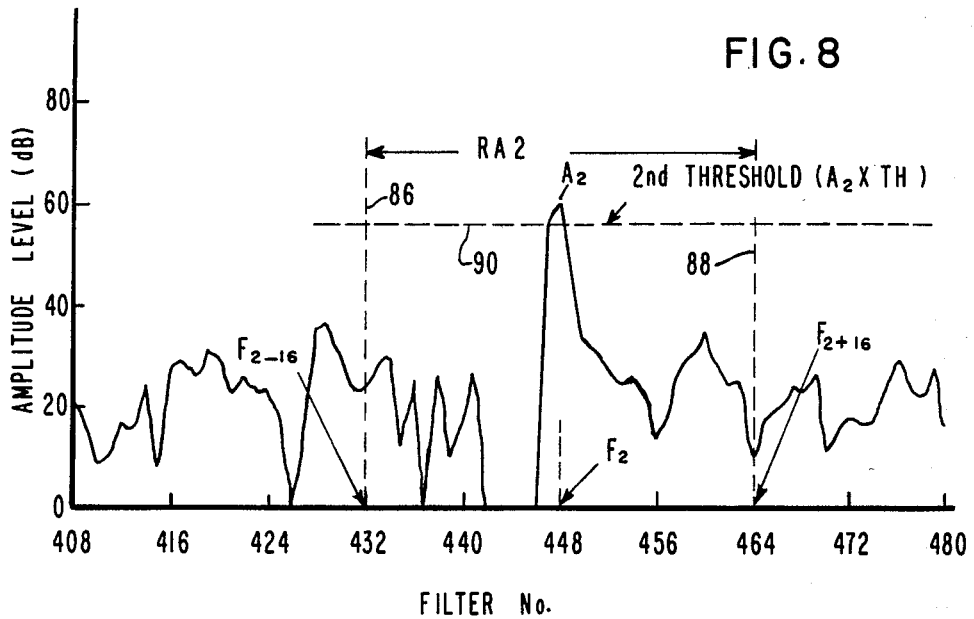
FIG. 8 is a graph illustrating second pass search and window selection operations suitable for use in the embodiment of FIG. 2.

After the attenuation step, a second doppler frequency is identified from the selected set of doppler frequencies in accordance with the amplitude of the signal associated therewith. The identification of the second doppler frequency F2 is performed by the second pass search function 82 as shown in the functional schematic of FIG. 2. More specifically, the doppler frequency F2 is identified as having the largest amplitude of the unattenuated signals in the selected subset of continuous doppler frequency signals, denoted as RA1B in FIG. 7. Thereafter, in the second pass window function 84, a second contiguous subset of doppler frequencies, denoted as RA2 in FIG. 8, is selected from the set of doppler frequencies and positioned about the identified second doppler frequency F2. In the present embodiment, this selected second subset includes 32 doppler frequency filters and extends from the doppler frequency $F2-16$ to the doppler frequency $F2+16$ as shown by the dashed lines 86 and 88, respectively, in FIG. 8.

Figure 9:
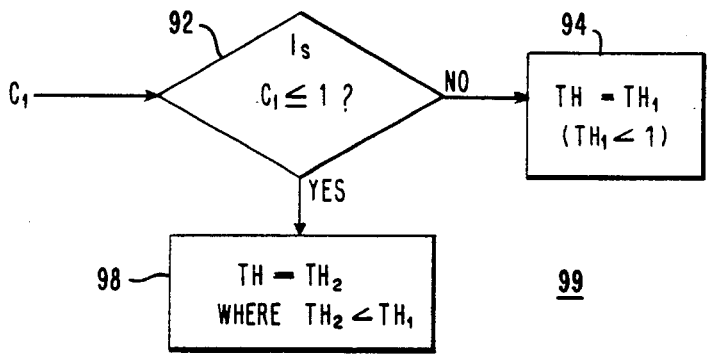
FIG. 9 is a flow chart suitable for describing the second pass threshold select operation of the embodiment of FIG. 2.

A second threshold level 90 is derived based on the amplitude A2 of the second doppler frequency signal F2 and the established first count $C_1$. The particular method used for the present embodiment for deriving the second threshold level 90 may be described using the flow chart of FIG. 9 which depicts the operation of the functional block in the block schematic of FIG. 2 in which it is determined which of two threshold multiplier values is to be used as a multiplication factor in multiplying the peak amplitude A2, the resulting product being the second threshold level. Referring to FIG. 9, in the decisional block 92 it is determined if the established first count $C_1$ is less than or equal to 1. If $C_1$ is greater than 1, then in functional block 94 the threshold multiplier is set equal to the first pass threshold multiplier TH1 which is used to multiply the amplitude A2 to derive the second threshold level 90 in the multiplication block 96 of FIG. 2. If $C_1$ is less than or equal to 1 as determined by the decisional block 92, then the threshold multiplier is set equal to a second pass threshold multiplier TH2 in functional block 98 and this multiplication factor TH2 is used to multiply the amplitude A2 in the multiplier 96 to produce the second threshold level 90.

The second pass threshold level 90 is utilized by a second pass threshold detection function 100 for the purposes of counting the doppler frequency signal amplitudes in the second subset RA2 which exceed the second threshold level 90 to establish a second count (see FIG. 8). More specifically, in connection with determining the second count, groupings of contiguous doppler frequency signal amplitudes which exceed the second threshold level are identified in the detection function 100 and bit patterns are set in a similar manner as that described for the detection function 73 of the first pass. The bit patterns are provided to a second pass doppler clump counter function 102 which partitions each bit pattern grouping into clumps and counts the partition clumps to establish the second count C2. The partitioning and counting of the clumps is performed in a similar manner as that described in connection with the graphic examples of FIG. 6.

Thus, in the post detection processing of the radar, for each selected range gate of a radar look, first and second pass counts $C_1$ and $C_2$, respectively, are established and provided to the programmed radar computer 28 along with their corresponding identified doppler frequencies F1 and F2 via output buffer 48. Accordingly, in connection with a predetermined count algorithm, denoted as RA count algorithm in FIG. 2, a final count is derived for each range gate of the selection of range gates of a radar look. More specifically, the RA count algorithm derives an intermediate count C in accordance with the following mathematical expression:

$$C = C_1 - |C_2 - C_1| + 1. \qquad (1)$$

Thereafter, the final count becomes the intermediate count if the intermediate count is derived as being greater than or equal to 1, or becomes equal to 1 if the intermediate count is derived as less than 1.

In addition to the two passes, the counting method may additionally include CFAR threshold detector function 71 as shown in the schematic diagram of FIG. 2 for the purposes of evaluating counts that are obtained from range gates that have an inadequate signal to noise ratio or other interference (i.e. signal quality). The CFAR function 71 may be determined from doppler frequency signals like those which are graphically illustrated in the FIG. 5, for example. More specifically, certain signal amplitudes of doppler frequencies of the presearch window which are outside of the first contiguous subset RA1 may be selected and combined to form a signal amplitude summation. In the example as shown in FIG. 5, the doppler signal amplitudes selected extend from $F1-21$ to $F1-36$ and $F1+20$ to $F1+35$ and are denoted as CFARA and CFARB, respectively. The CFAR regions A and B of FIG. 5 include 32 filter amplitudes in total which are summed to obtain an average interference level outside of the subset window RA1. Each average interference level of a range gate may be multiplied by a noise threshold multiplier or multiplication factor to derive a CFAR threshold level. Thereafter, a digital blanking bit may be set corresponding to a range gate in which a signal amplitude of the selected set outside of the first subset exceeds the CFAR threshold level. The pattern of bits provided to the programmed radar computer from the CFAR function 71 is for the purposes of zeroing (i.e. setting to zero) the derived final counts of those range gates corresponding to the set blanking bits, whereby the zeroed final counts do not contribute to the total final count in the cumulative count algorithm as described hereabove and which will be described in greater detail herebelow.

As indicated above, the final counts established for each of the selected range gates may be used in accordance with a predetermined cumulative count algorithm to establish a total final count in the programmed radar computer 28. In connection with the step of combining the final counts, two other areas may be pursued. One area concerns that of invalidating the final counts derived from selected range gates that are determined to have an inadequate doppler frequency signal quality. This area has already been described in connection with CFAR threshold detection function 71, in which case, range gate blanking flags $RGBF_r$ are provided to the radar computer 28 via output buffer 48 for each of the selected range gates r. The second area concerns the avoidance of multiple countings of a common target which straddles a pair of adjacent range gates. The implementation of a suitable straddle detection logic will be more fully explained in connection with the following description.

Figure 11:
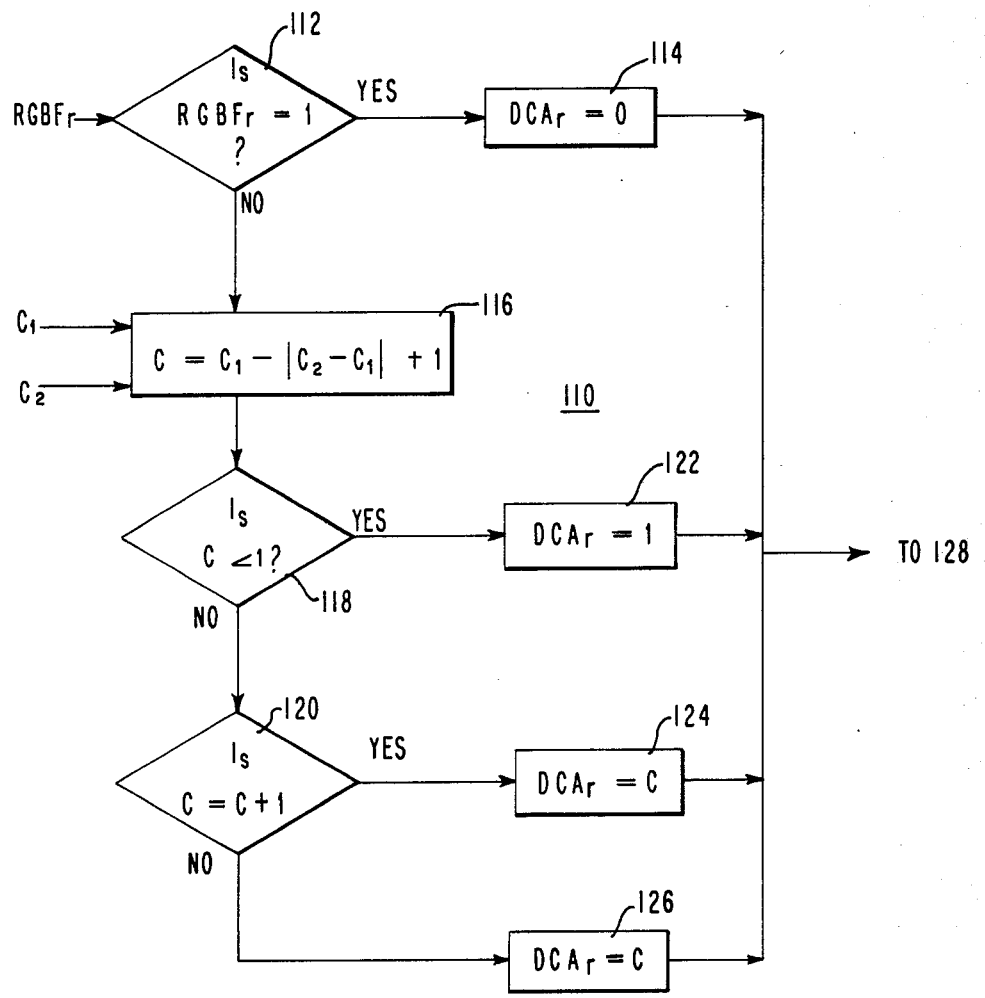
FIG. 11 is a functional flow chart suitable for use in the radar computer of the embodiment of FIG. 1 for determining the target count of a typical range gate r.
Figure 12:
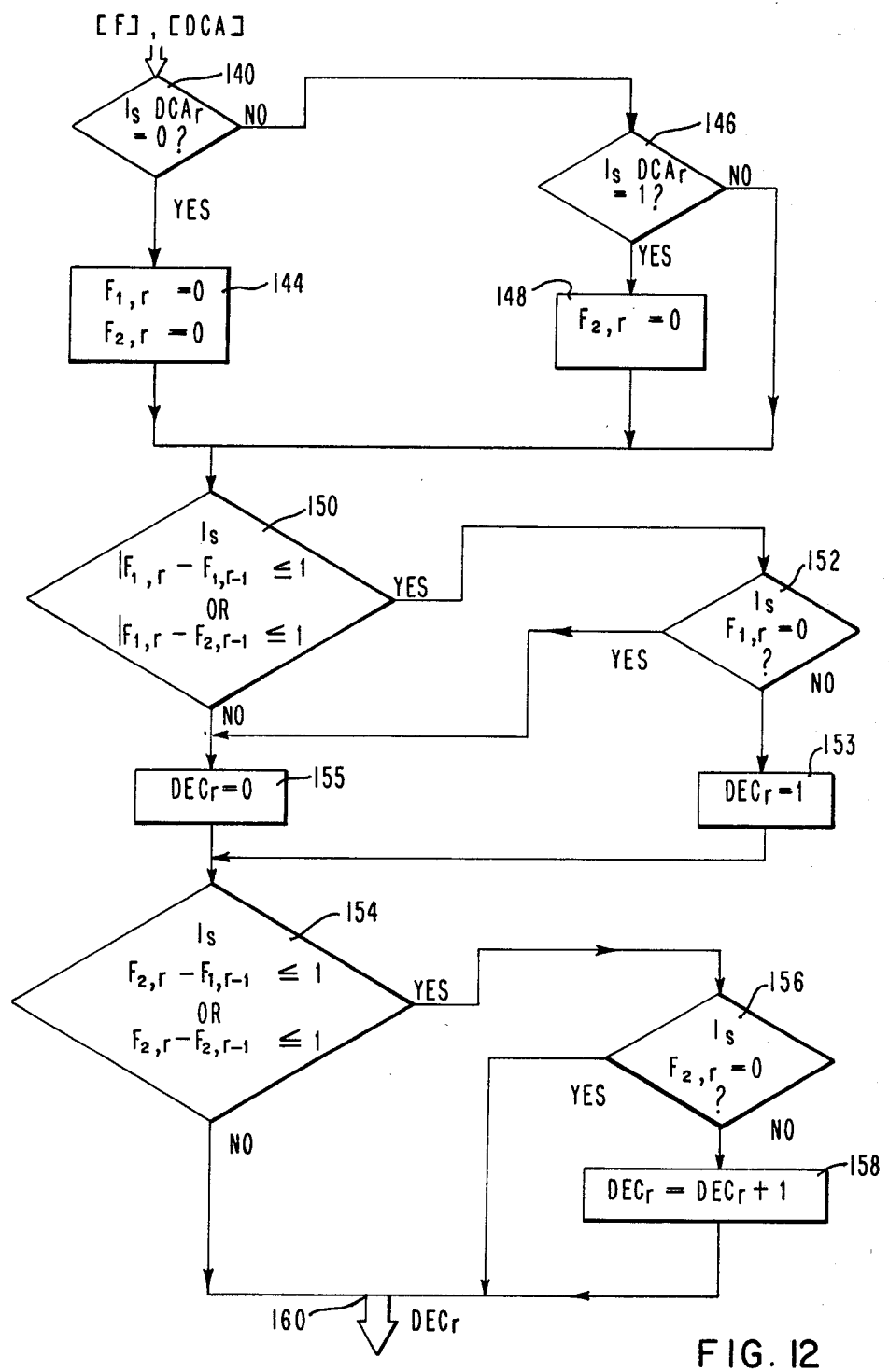
FIG. 12 is a functional flow chart which depicts a straddle detection logic algorithm suitable for use in the cumulative count algorithm depicted in FIG. 10.

A suitable cumulative count algorithm for determining a total final count from the selected group of contiguous range gates may be described in connection with the functional flow charts of FIGS. 10, 11 and 12. In the present example, 16 contiguous range gates are selected as a group in the input buffer 26 for use in determining the total final count in any radar look. Thus for each range gate r of the selected group there will be established a range gate blank flag $RGBF_r$, first and second pass counts $C_1,r$ and $C_2,r$ along with their identified first and second doppler frequencies $F1,r$ and $F2,r$. Referring to the flow diagram of FIG. 10, corresponding range gate blank flags and first and second counts are provided to a doppler count algorithm in functional block 110 which computes a final count denoted as $DCA_r$ for each of the selected range gates r.

A suitable doppler count algorithm 110 may be described in connection with the flow chart of FIG. 11 which is operative to compute the final counts $DCA_r$ for each of the selected range gates of the group either simultaneously or sequentially dependent on the implementation thereof. The example shown by the flow chart of FIG. 11 illustrates the processing of a typical range gate r of the group. The range gate blank flag is provided to a decisional block 112 which determines if the flag is set. If set, the final count $DCA_r$ is set to 0 in the functional block 114. Otherwise, the first and second counts $C_1$ and $C_2$ are provided to the count algorithm block 116 for determining the intermediate count C. In the decisional blocks 118 and 120, it is determined if the intermediate count is less than or equal to 1 or greater than 1, as described hereabove, and the resulting decisions of blocks 118 and 120 govern the setting of the final counts $DCA_r$ in the blocks 122, 124 and 126. The derived final counts $DCA_r$ are accumulated in accordance with the algorithm shown in the block of 128 of FIG. 10.

Figure 10:
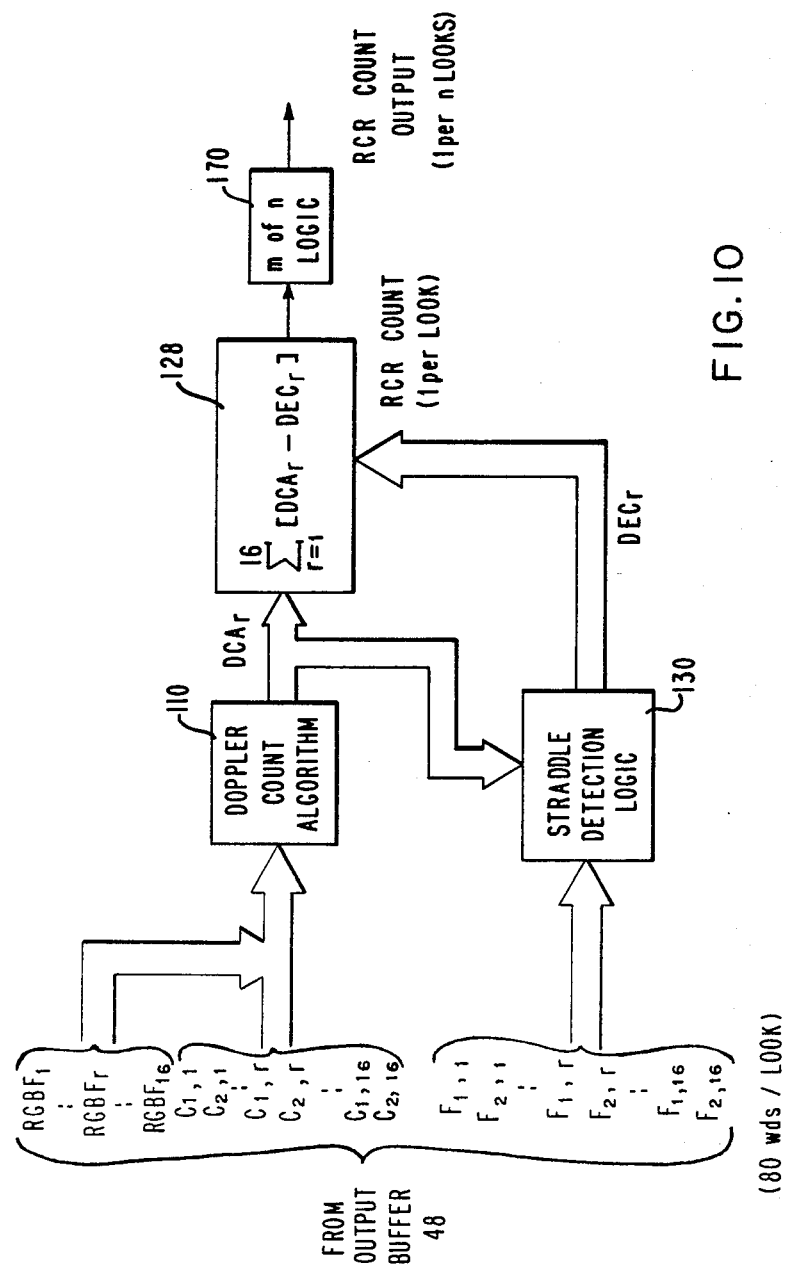
FIG. 10 is a functional flow chart of a cumulative count algorithm suitable for use in the radar computer of the embodiment of FIG. 1 for determining a total final count from the final counts of a selected group of contiguous range gates.

In addition, the derived final counts $DCA_r$ and corresponding identified first and second output frequencies associated therewith for each range gate r are provided to a straddle detection logic block 130 for the avoidance of multiple countings of a common target in the cumulative count algorithm as depicted in the schematic of FIG. 10. In general, the straddle detection logic 130 alters the first and second output frequencies F1 and F2 of each range gate r of the selected group in accordance with the established total count $DCA_r$ thereof. Thereafter, the resulting first and second doppler frequencies of range gate r are compared with the resulting first and second doppler frequencies of an adjacent range gate r−1 to identify commonly related first and second doppler frequencies. The final count $DCA_r$ of each range gate r is caused to be decremented in accordance with the number of identified commonly related first and second doppler frequencies of each compared pair r and r−1 of range gates. The decremented final counts of the range gates of the selected group may be totaled in accordance with the cumulative algorithm of block 128 to establish the total final count.

More specifically, a suitable straddle detection logic algorithm for use in the cumulative count algorithm of FIG. 10 may be described in connection with the flow chart of FIG. 12. The final counts DCA and associated identified doppler frequencies F1 and F2 enter the flow chart at the point 140. Again it should be indicated that the steps of the straddle detection methods may be processed either simultaneously or sequentially in accordance with the information of each range gate to determine the proper decrementation of the corresponding final counts. In decisional block 142, it is determined if the final count DCA of a range gate is 0. If affirmative, the identified doppler frequencies associated therewith are both set to 0 in the block 144. Otherwise, it is next determined, in the decisional block 146, if the final count is equal to 1. If affirmative, the second doppler frequency is set to 0 in block 148. The outputs of blocks 144, 148 and a negative response to decisional block 146 all continue processing at the decisional block 150.

In 150, it is determined if the spread of the identified first doppler frequencies of the present range gate r and adjacent range gate r−1 is less than or equal to 1 or if the spread of the first doppler frequency of the present range gate r and the second doppler frequency of the adjacent range gate r−1 is less than or equal to 1. If the decision of block 150 is affirmative, it is next determined if the first doppler frequency of the present range gate r is set equal to 0 in decision block 152. If the decision of block 152 is negative, a decrement number denoted as $DEC_r$ is set equal to 1 and the execution continues at the decisional block 154. If the decision of block 150 is negative or the decision of block 152 is affirmative, then the decrement number $DEC_r$ is set equal to 0 in block 155 with the execution continuing at decisional block 154.

In the decisional block 154, it is determined if the spread between the second doppler frequency of the present range gate r and the first doppler frequency of the adjacent range gate r−1 is less than or equal to 1 or if the spread between the second doppler frequency of the present range gate r and the seond doppler frequency of the adjacent range gate r−1 is less than or equal to 1. If affirmative, it is next determined if the second doppler frequency of the present range gate r is set equal to 0 in the decisional block 156. If not, the decrement number $DEC_r$ is incremented by 1 in a block 158. A negative response to the decisional block 154, an affirmative response to the decisional block 156 and the output of block 158 all exit the flow diagram at 160 with a decrement count $DEC_r$ for each of the selected range gates r. The decrement counts are provided to the cumulative algorithm of block 128 are shown in the flow diagrams of FIG. 10.

In the algorithm of block 128, each decrement count $DEC_r$ is subtracted from its corresponding final count $DCA_r$ and the resulting differences are summed over the selected 16 contiguous range gates of the group thus establishing a total final count for the radar look. In some situations it may be desirable to compute a total final count for more than one radar look, in which case the total final counts may be averaged over a number of radar looks to increase the accuracy of the target count. In the example of FIG. 10, an m of n logic functional block 170 is operative in accordance with a conventional averaging technique to derive a total final count per n number of looks.

Figure 13:
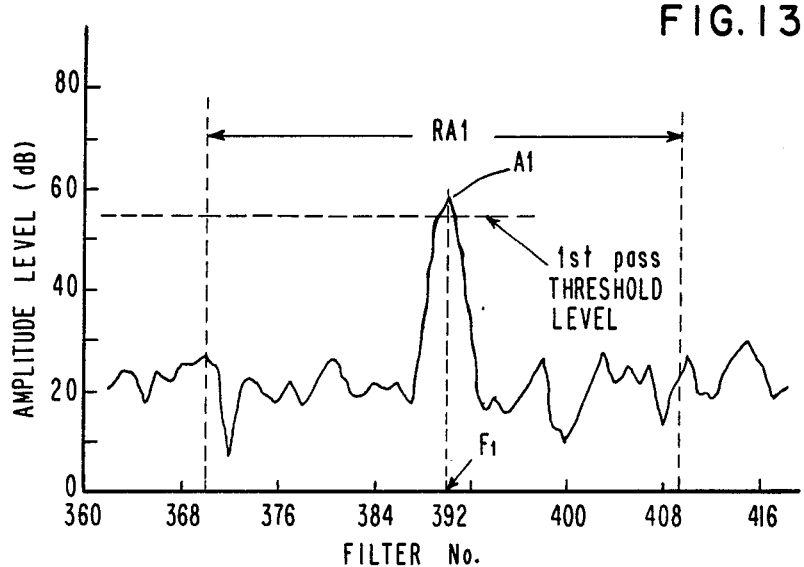
FIGS. 13, 14 and 15 graphically illustrate a single target recordation of doppler frequency spectra exemplifying a first pass doppler frequency window selection, attenuation blanking of a group of doppler frequencies about an identified first doppler frequency, and a second pass doppler frequency window selection, respectively.
Figure 14:
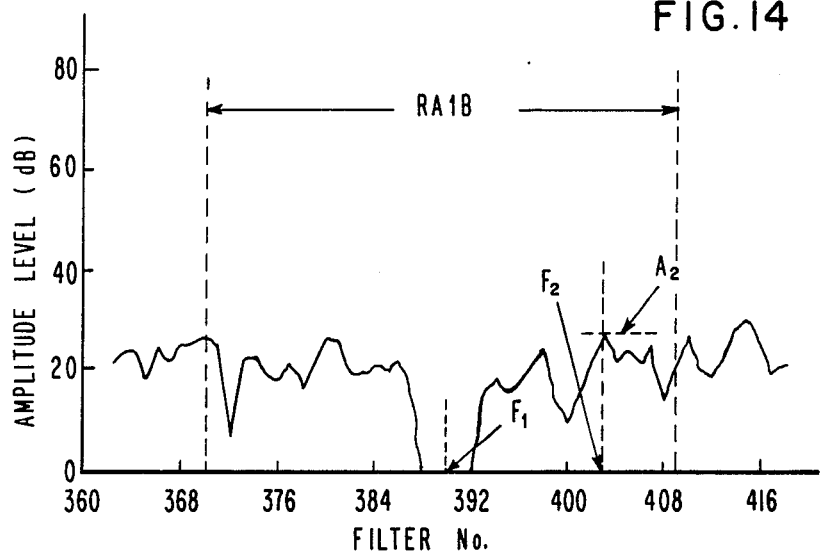
Figure 15:
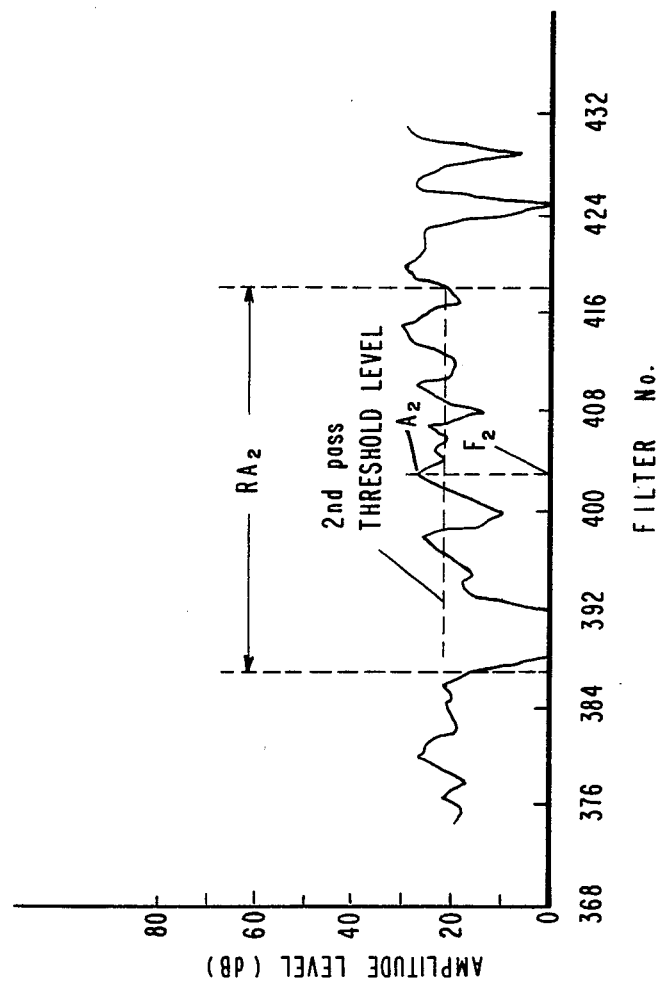

A computer simulation has been programmed in accordance with the method described hereabove in connection with FIGS. 1-12 for experimentation use with recorded single target and multi-target radar echo data. Experimental radar echo data was collected in an actual fly over of two aircraft. Radar looks were recorded one second apart to provide for about 2.5 minutes of multiple target data for use in the computer simulation. In addition to the double target runs, a number of single target recordings with different aircraft using the same data collection format have been collected. FIGS. 13, 14 and 15 graphically illustrate a single target recordation of doppler frequency spectra indicating the first pass window RA1, attenuation blanking about the identified first doppler frequency F1 at filter number 390 and second pass window RA2.

Noteworthy is the operation of the second pass threshold level in a typical single target situation. That is, in the absence of a distinguishable second target peak, the second pass threshold level will normally end up in the noise of the doppler frequency spectra giving rise to a fairly large $C_2$ count. The intermediate count $C$ derived from the count $C_1$ and $C_2$ in accordance with the equation (1) found hereabove will then be negative. In deriving the final count, a negative or zero value of the intermediate count $C$ is always interpreted as a target count of 1 in the preferred method. The second pass threshold level derivation as described hereabove in connection with functional block 99 of FIG. 2 enhances the single target counting and discrimination. This is because the second pass threshold level is set about 2 db's lower than the first pass threshold level whenever a $C_1$ count of 1 occurs on the first pass. In accordance with the experimental tests conducted, the probability of correct count improved about 10% when the second pass threshold enhancement method was implemented.

Figure 16:
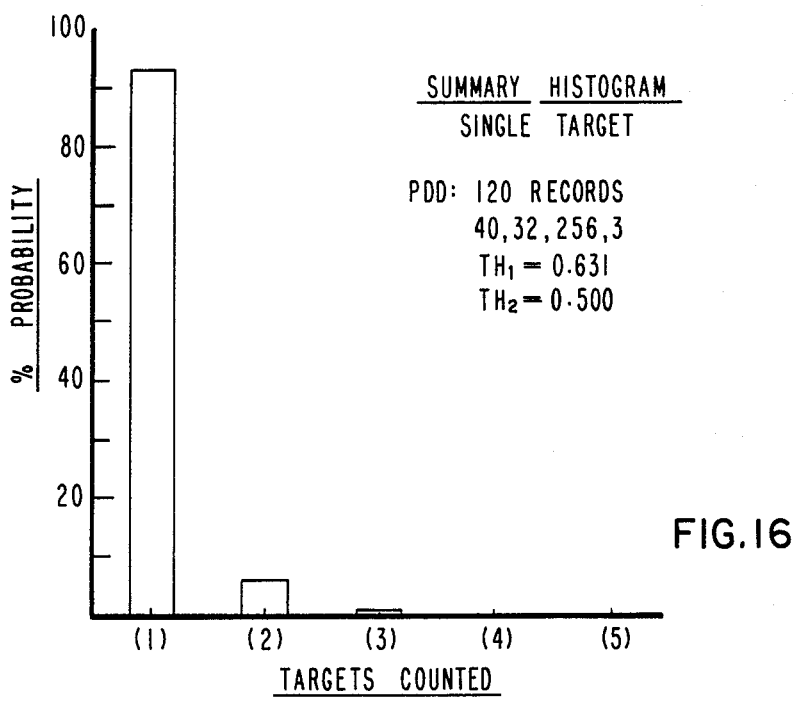
FIGS. 16 and 17 are histograms representing typical final count statistics with single and double target test data.
Figure 17:
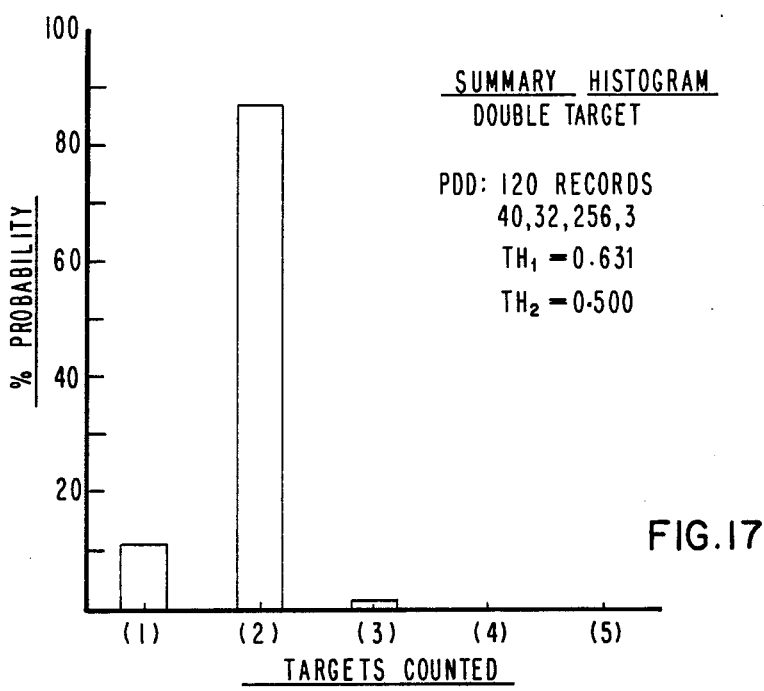

Typical final count statistics with single target and double target test data are summarized in the form of histograms in FIG. 16 and 17, respectively. A probability of correct count on single target data was 93% and on double target data was 87%. That is, in the experimental trials with the recorded radar data, the inventive method was able to identify the presence of two targets with 87% accuracy and the probability of an incorrect count when only one target was present was 7%. These results were obtained using 120 recordations of the real data recordings described hereabove wherein the simulation included the following parameters:

RA1 window—40 filters;
RA2 window—32 filters;
Presearch Window—256 filters;
Clump with Limitations—0.500;
First Pressure Level—0.631;
Second Pass Threshold Level—0.500.

I claim:

1. In the post detection processing of a radar, a method of counting multiple targets moving in close proximity to one another comprising the steps of:
   (a) selecting a set of contiguous doppler frequency signals from a plurality of doppler frequency signals computed from the received echo signal information in a range gate of a radar look;
   (b) identifying a first doppler frequency from said selected set in accordance with the amplitude of the signal associated therewith;
   (c) selecting a first contiguous subset of doppler frequencies of said set positioned about said first doppler frequency;
   (d) deriving a first threshold level based on the amplitude of said first doppler frequency signal;
   (e) counting the doppler frequency signal amplitudes in said first contiguous subset which exceed said first threshold signal to establish a first count;
   (f) thereafter, identifying a second doppler frequency from said selected set in accordance with the amplitude of the signal associated therewith;
   (g) selecting a second contiguous subset of doppler frequencies of said set positioned about said second doppler frequency;
   (h) deriving a second threshold level based on the amplitude of said second doppler frequency signal and said established first count;
   (i) counting the doppler frequency signal amplitudes in said second contiguous subset which exceed said second threshold level to establish a second count; and
   (j) deriving a final count from said first and second counts in accordance with a predetermined count algorithm, whereby said final count is representative of the multi-target count for the range gate being processed.

2. The method in accordance with claim 1 wherein the first doppler frequency is identified as having the largest amplitude signal in the selected set of contiguous doppler frequency signals; and wherein the step of identifying the second doppler frequency include the steps of:
   attenuating the signal amplitudes of the first doppler frequency and a predetermined group of doppler frequencies positioned thereabout; and
   thereafter, identifying the second doppler frequency as having the largest amplitude of the unattenuated signals in the selected set of contiguous doppler frequency signals.

3. The method in accordance with claim 2 wherein the signals of the first doppler frequency and the group of doppler frequencies positioned thereabout are attenuated by blanking the amplitudes thereof.

4. The method in accordance with claim 1 wherein the step of counting to establish the first count includes the steps of:
   identifying groupings of contiguous doppler frequency signal amplitudes which exceed the first threshold value;
   partitioning each grouping into clumps; and
   counting the partitioned clumps to establish the first count; and wherein the step of counting to establish the second count includes the steps of:
   identifying groupings of contiguous doppler frequency signal amplitudes which exceed the second threshold level;
   partitioning each grouping into clumps; and
   counting the partitioned clumps to establish the second count.

5. The method in accordance with claim 4 wherein each grouping is partitioned into clumps which are limited to a prespecified number of contiguous doppler frequency signal amplitudes.

6. The method in accordance with claim 1 wherein the step of deriving the first threshold level includes multiplying the first doppler frequency signal amplitude with a first multiplication factor which is less than 1;

and wherein the step of deriving the second threshold level includes the steps of:

multiplying the second doppler frequency signal amplitude with said first multiplication factor if the first count is greater than 1; and multiplying the second doppler frequency signal amplitude with a second multiplication factor which is less than said first multiplication factor if the first count is less than or equal to 1.

7. The method in accordance with claim 1 wherein the first and second contiguous subsets of doppler frequencies of the set are selected as being centered about the first and second doppler frequencies, respectively.

8. The method in accordance with claim 1 wherein the step of deriving the final count from the first ($C_1$) and second ($C_2$) counts include the steps of:

deriving an intermediate final count (C) in accordance with a count algorithm which is expressed mathematically as:

$$C = C_1 - |C_2 - C_1| + 1;$$

deriving the final count as the intermediate count if the intermediate count is derived as greater than or equal to 1; and deriving the final count as 1 if the intermediate count is derived as less than 1.

9. The method in accordance with claim 1 including the steps of:

selecting a group of contiguous range gates of the received echo signals of a radar look;

processing the received echo signal information of each selected range gate of a radar look in accordance with the method steps (a) through (j) to establish a final count for each selected range gate; and combining the final counts established for each selected range gate in accordance with a predetermined cumulative count algorithm to establish a total final count, whereby said total final count is representative of the discriminative target count for the portion of the radar range determined by the selected group of range gates of a radar look.

10. The method in accordance with claim 9 including the step of invalidating the final counts derived from selected range gates that are determined to have inadequate doppler frequency signal quality, whereby the invalidated final counts are not combined in the cumulative count algorithm in establishing the total final count.

11. The method in accordance with claim 10 wherein the step of invalidating the final count of a range gate includes the steps of:

combining the signal amplitudes of selected doppler frequencies of the set of doppler frequency signals which are outside of the first contiguous subset to form a signal amplitude summation;

deriving a third threshold signal in accordance with said signal amplitude summation; and setting the derived final count of the range gate to 0 if a signal amplitude of the selected set outside the first subset exceeds said third threshold level, thereby invalidating the final count of the range gate so as not to contribute to the total final count.

12. The method in accordance with claim 9 wherein the step of combining the final counts include the steps of:

altering the first and second doppler frequencies of each range gate r of the selected group of contiguous range gates in accordance with the established final counts thereof;

thereafter comparing the resulting first and second doppler frequencies of each range gate r with the resulting first and second doppler frequencies of an adjacent range gate $r-1$ to identify commonly related first and second doppler frequencies;

decrementing a final count of each range gate r in accordance with the number of identified commonly related first and second doppler frequencies of each compared pair r and $r-1$ of range gates; and totaling the decremented final counts of the range gates of the selected group to establish the total final count, whereby an attempt is made to avoid multiple countings of a common target which straddles a pair of range gates.

* * * * *